US011231225B2

(12) United States Patent
Holladay et al.

(10) Patent No.: US 11,231,225 B2
(45) Date of Patent: Jan. 25, 2022

(54) ACTIVE MAGNETIC REGENERATIVE PROCESSES AND SYSTEMS EMPLOYING HYDROGEN AS HEAT TRANSFER FLUID AND PROCESS GAS

(71) Applicants: Jamie D. Holladay, Richland, WA (US); John Barclay, Richland, WA (US)

(72) Inventors: Jamie D. Holladay, Richland, WA (US); John Barclay, Richland, WA (US)

(73) Assignees: Battelle Memorial Institute, Richland, WA (US); Emerald Energy NW, LLC, Bothell, WA (US)

( * ) Notice: Subject to any disclaimer, the term of this patent is extended or adjusted under 35 U.S.C. 154(b) by 520 days.

(21) Appl. No.: 15/937,773

(22) Filed: Mar. 27, 2018

(65) Prior Publication Data
US 2018/0283772 A1     Oct. 4, 2018

Related U.S. Application Data

(60) Provisional application No. 62/477,928, filed on Mar. 28, 2017.

(51) Int. Cl.
    *F25J 1/02*        (2006.01)
    *F25J 1/00*        (2006.01)
    (Continued)

(52) U.S. Cl.
    CPC .............. *F25J 1/0225* (2013.01); *F25J 1/001* (2013.01); *H01F 1/015* (2013.01); *F25B 21/00* (2013.01);
    (Continued)

(58) Field of Classification Search
CPC . F25B 21/00; H01F 1/017; H01F 1/015; F25J 1/0005; F25J 1/001; F25J 2215/10; F25J 2270/908; F25J 2205/86
(Continued)

(56) References Cited

U.S. PATENT DOCUMENTS 3,108,444 A    10/1963    Kahn
3,841,107 A    10/1974    Clark
(Continued)

FOREIGN PATENT DOCUMENTS

WO    WO 2017/149434    9/2017
WO    WO-2017149434 A1 *    9/2017    ............. F25B 21/00

OTHER PUBLICATIONS

Ortho-Para Catalysis in Liquid-Hydrogen Production—Weitzel et al. (Mar. 1958) (Year: 1958).*

(Continued)

*Primary Examiner* — Len Tran
*Assistant Examiner* — Jenna M Hopkins
(74) *Attorney, Agent, or Firm* — Klarquist Sparkman, LLP

(57) ABSTRACT

A system including:
an active magnetic regenerative refrigerator apparatus that includes a high magnetic field section in which a hydrogen heat transfer fluid can flow from a cold side to a hot side through at least one magnetized bed of at least one magnetic refrigerant, and a low magnetic field or demagnetized section in which the hydrogen heat transfer fluid can flow from a hot side to a cold side through the demagnetized bed;
a first conduit fluidly coupled between the cold side of the low magnetic field or demagnetized section and the cold side of the high magnetic field section; and
(Continued)

a second conduit fluid coupled to the first conduit, an expander and at least one liquefied hydrogen storage module.

20 Claims, 3 Drawing Sheets

(51) Int. Cl.
*H01F 1/01* (2006.01)
*F25B 21/00* (2006.01)

(52) U.S. Cl.
CPC ..... *F25B 2321/0021* (2013.01); *F25J 1/0005* (2013.01); *F25J 2205/86* (2013.01); *F25J 2215/10* (2013.01); *F25J 2270/908* (2013.01); *H01F 1/017* (2013.01)

(58) Field of Classification Search
USPC .................................................. 62/3.1, 301
See application file for complete search history.

(56) References Cited

U.S. PATENT DOCUMENTS

| | | | | |
|---|---|---|---|---|
| 4,107,935 A * | 8/1978 | Steyert, Jr. | ................ | F25B 9/00 62/3.1 |
| 4,332,135 A * | 6/1982 | Barclay | ................... | F25B 21/00 62/3.1 |
| 4,408,463 A * | 10/1983 | Barclay | ................... | F25B 21/00 505/889 |
| 4,441,325 A * | 4/1984 | Bon-Mardion | ......... | F25B 21/00 62/3.1 |
| 4,507,927 A * | 4/1985 | Barclay | ................... | F25B 21/00 62/467 |
| 4,702,090 A * | 10/1987 | Barclay | ................... | F25B 21/00 62/3.3 |
| 4,704,871 A * | 11/1987 | Barclay | ................... | F25B 21/00 62/3.1 |
| 4,829,770 A * | 5/1989 | Hashimoto | .............. | C09K 5/16 62/3.1 |
| 5,124,215 A * | 6/1992 | Hashimoto | .............. | C09K 5/16 428/548 |
| 5,182,914 A | 2/1993 | Barclay et al. | | |
| 5,209,068 A * | 5/1993 | Saji | ........................ | F25B 21/00 62/3.1 |
| 5,213,630 A * | 5/1993 | Hashimoto | .............. | C09K 5/16 148/301 |
| 5,249,424 A * | 10/1993 | DeGregoria | ............ | F25B 21/00 62/3.1 |
| 5,435,137 A * | 7/1995 | Gschneidner, Jr. | ...... | H01F 1/015 148/301 |
| 5,444,983 A * | 8/1995 | Howard | .................. | F25B 21/00 62/3.1 |
| 5,462,610 A * | 10/1995 | Gschneidner, Jr. | ...... | C22C 28/00 148/301 |
| 5,641,424 A | 6/1997 | Ziolo et al. | | |
| 5,743,095 A * | 4/1998 | Gschneidner, Jr. | ...... | F25B 21/00 148/301 |
| 5,887,449 A * | 3/1999 | Pecharsky | ............... | F25B 21/00 62/3.1 |
| 6,245,250 B1 | 6/2001 | Krawzak et al. | | |
| 6,332,323 B1 * | 12/2001 | Reid | ..................... | F25B 29/003 62/6 |
| 6,406,523 B1 * | 6/2002 | Connor | ............. | B01D 53/0431 96/125 |
| 6,467,274 B2 * | 10/2002 | Barclay | ................... | F25J 1/001 62/3.1 |
| 6,526,759 B2 * | 3/2003 | Zimm | ..................... | F25B 21/00 62/3.1 |
| 6,589,366 B1 * | 7/2003 | Gschneidner, Jr. | ...... | C22C 28/00 148/101 |
| 6,676,772 B2 * | 1/2004 | Saito | ...................... | H01F 1/015 148/301 |
| 6,758,046 B1 * | 7/2004 | Barclay | ..................... | C01B 3/00 62/3.1 |
| 7,076,959 B2 * | 7/2006 | Lewis | ..................... | H01F 1/017 252/62.55 |
| 8,015,808 B2 * | 9/2011 | Keefer | .................. | F17C 11/005 60/517 |
| 8,037,692 B2 * | 10/2011 | Muller | .................... | F25B 21/00 62/3.1 |
| 8,061,147 B2 | 11/2011 | Dinesen et al. | | |
| 8,099,964 B2 | 1/2012 | Saito et al. | | |
| 8,551,210 B2 | 10/2013 | Reppel et al. | | |
| 8,683,815 B2 * | 4/2014 | Muller | .................... | F25B 21/00 62/3.1 |
| 8,763,407 B2 * | 7/2014 | Carroll | ...................... | F28F 7/00 62/3.1 |
| 8,852,328 B2 * | 10/2014 | Barclay | .................. | B01D 53/06 96/125 |
| 8,935,927 B2 * | 1/2015 | Kobayashi | .............. | F25B 21/00 62/3.1 |
| 9,175,885 B2 | 11/2015 | Katter | | |
| 9,245,673 B2 * | 1/2016 | Carroll | .................... | H01F 1/015 |
| 9,302,215 B2 * | 4/2016 | Barclay | ..................... | F28F 9/26 |
| 9,310,108 B2 | 4/2016 | Kaji et al. | | |
| 9,528,728 B2 * | 12/2016 | Smith | ...................... | F25B 21/00 |
| 9,677,792 B2 | 6/2017 | Auringer et al. | | |
| 9,739,510 B2 * | 8/2017 | Hassen | .................. | F25B 21/00 |
| 9,746,214 B2 | 8/2017 | Zimm et al. | | |
| 9,777,952 B2 * | 10/2017 | Eriksen | ................... | F25B 21/00 |
| 9,791,182 B2 | 10/2017 | Muller | | |
| 9,797,630 B2 | 10/2017 | Benedict et al. | | |
| 9,995,511 B2 | 6/2018 | Leonard et al. | | |
| 10,138,139 B2 | 11/2018 | Kokkinos et al. | | |
| 10,213,834 B2 * | 2/2019 | Vieyra Villegas | ...... | H01F 41/00 |
| 10,229,775 B2 * | 3/2019 | Scharf | .................... | F25B 21/00 |
| 10,281,176 B2 * | 5/2019 | Mun | ....................... | F25B 21/00 |
| 10,443,928 B2 * | 10/2019 | Holladay | ................ | F25B 21/00 |
| 10,520,229 B2 | 12/2019 | Schroeder et al. | | |
| 10,527,325 B2 | 1/2020 | Schroeder et al. | | |
| 10,551,095 B2 | 2/2020 | Schroeder | | |
| 10,557,649 B2 * | 2/2020 | Schroeder | ............... | F25B 21/00 |
| 10,612,668 B1 * | 4/2020 | Barclay | ................... | F25B 21/00 |
| 10,641,539 B2 * | 5/2020 | Schroeder | ............... | H01F 1/012 |
| 10,648,704 B2 * | 5/2020 | Schroeder | ............. | F28D 9/0012 |
| 10,648,705 B2 * | 5/2020 | Schroeder | ............... | F25D 11/02 |
| 10,648,706 B2 * | 5/2020 | Schroeder | ............... | F25B 21/00 |
| 10,684,044 B2 * | 6/2020 | Schroeder | ........... | F28D 15/0275 |
| 2002/0040583 A1 * | 4/2002 | Barclay | .................... | F25J 1/001 62/3.1 |
| 2006/0080979 A1 | 4/2006 | Kitanovski et al. | | |
| 2007/0144181 A1 * | 6/2007 | Kitanovski | ............. | F25B 21/00 62/3.1 |
| 2008/0016907 A1 * | 1/2008 | Barclay | .................... | F25J 1/0022 62/612 |
| 2008/0314049 A1 * | 12/2008 | Shin | ........................ | F25B 21/00 62/3.1 |
| 2009/0199574 A1 * | 8/2009 | Hirose | ................... | C01B 3/0005 62/46.1 |
| 2010/0175392 A1 * | 7/2010 | Malloy | .................... | H01L 37/02 62/3.2 |
| 2010/0212327 A1 * | 8/2010 | Barve | ..................... | F25B 21/00 62/3.1 |
| 2011/0048032 A1 | 3/2011 | Chang et al. | | |
| 2011/0062821 A1 | 3/2011 | Chang et al. | | |
| 2011/0308258 A1 | 12/2011 | Smith et al. | | |
| 2013/0019610 A1 * | 1/2013 | Zimm | ..................... | F25B 21/00 62/3.1 |
| 2013/0042632 A1 | 2/2013 | Muller et al. | | |
| 2015/0068219 A1 * | 3/2015 | Komorowski | .......... | F25B 21/00 62/3.1 |
| 2015/0068246 A1 * | 3/2015 | Hakamade | .............. | F25B 9/002 62/607 |
| 2015/0168030 A1 | 6/2015 | Leonard et al. | | |
| 2017/0241706 A1 * | 8/2017 | Holladay | ................. | F25J 1/001 |
| 2017/0244120 A1 * | 8/2017 | Holladay | ................. | F25J 1/001 |
| 2017/0372821 A1 * | 12/2017 | Scharf | ................... | C09D 133/12 |
| 2018/0283740 A1 * | 10/2018 | Holladay | ................ | H01F 1/012 |
| 2018/0283772 A1 * | 10/2018 | Holladay | ................ | H01F 1/015 |

(56) References Cited

U.S. PATENT DOCUMENTS

2019/0137171 A1\* 5/2019 Barclay ................... F25B 21/00
2019/0352747 A1\* 11/2019 Ihnfeldt ................. F25B 21/00
2019/0390899 A1\* 12/2019 Holladay ............... F25J 1/0225

OTHER PUBLICATIONS

Astronautics Corporation of America; Jul. 2, 1992; "Final Report on the Magnetic Liquefier for Hydrogen Project"; DOE Contract No. DE-AC02-90CE40895.
Barclay et al., "Active Magnetic Regenerative Liquefier: Final Report," Heracles Energy Corporation d.b.a Prometheus Energy, Jan. 12, 2016.
Barclay et al., "Active Magnetic Regenerative Liquefier: SBIR Phase I Final Report," 47 pages, U.S. Department of Energy Contract No. DOE SBIR DE-FG02-07ER84783, 2008.
Barclay et al., "Unique features of liquefaction of hydrogen and natural gas using magnetic refrigeration," *Proceedings of the 6th International Conference on Magnetic Refrigeration*, pp. 1-6, Sep. 7-10, 2014.
Barclay, "The theory of an active magnetic regenerative refrigerator," NASA Conference Publication, 13 pages, 1983.
Carpetis, "An assessment of the efficiency and refrigeration power of magnetic refrigerators with ferromagnetic refrigerants," *Advances in Cryogenic Engineering*, vol. 39.,1994.
DeGregoria et al., "Modeling the Active Magnetic Regenerator" *Advances in Cryogenic Engineering*, vol. 37, pp. 867-873, 1992.
Holladay et al., "III.10 Magnetocaloric Hydrogen Liquefaction FY 2016 Annual Progress Report," Pacific Northwest National Laboratory, 2016.
Holladay et al., "III.14 Magnetocaloric Hydrogen Liquefaction FY 2015 Annual Progress Report," Pacific Northwest National Laboratory, 2015.
International Search Report and Written Opinion issued for International Application No. PCT/US2018/024668 dated Jun. 20, 2018.
Janda et al., "Design of an active magnetic regenerative hydrogen liquefier," *Advances in Cryogenic Engineering*, vol. 37, 1992.
Non-Final Office Action issued by U.S. Patent and Trademark Office dated Jan. 30, 2019 for U.S. Appl. No. 15/438,529.
Rowe et al., "Ideal magnetocaloric effect for active magnetic regenerators," *J. Appl. Phys.*, 93(3): 1672-1676, Feb. 1, 2003.
Thomas, "Fuel cell and battery electric vehicles compared," *International Journal of Hydrogen Energy*, vol. 34, pp. 6005-6020, 2009.
U.S. Appl. No. 15/438,529, filed Feb. 21, 2017.
U.S. Appl. No. 15/438,536, filed Feb. 21, 2017.
U.S. Appl. No. 15/937,776, filed Mar. 27, 2018.
Zhang et al., "Design optimization of a 0.1-ton/day active magnetic regenerative hydrogen liquefier," *Cryogenics*, 40(4-5): 269-27 8, Apr.-May 2000.
Chen et al., "Development of a brassboard active magnetic regenerative refrigeration system for low temperature remote cooling," *Cryocoolers*, vol. 20, International Cryocooler Conference, Jun. 2018.
Final Office Action issued for U.S. Appl. No. 16/563,692 dated Jul. 28, 2020.
Holladay, "Investigation of bypass fluid flow in an active magnetic regenerative liquefier," Cryogenics, May 19, 2018.
Lionte, "Adapting an active flow magnetic regenerator to a continuous fluid flow application," International Journal of Refrigeration, Oct. 16, 2017.
Non-Final Office Action issued by U.S. Patent and Trademark Office dated Nov. 25, 2019 for U.S. Appl. No. 16/563,692.
Non-Final Office Action issued by U.S. Patent and Trademark Office dated Jun. 15, 2020 for U.S. Appl. No. 15/438,536.
Numazawa et al., "Magnetic refrigerator for hydrogen liquefaction," Cryogenics, Apr. 16, 2014.
Petitpas et al., "Liquid Hydrogen Infrastructure Analysis", Project ID#: PD135 DOE Hydrogen and Fuel Cells Annual Merit Review, Washington, D.C., Jun. 6, 2017.
U.S. Appl. No. 16/563,692, filed Sep. 6, 2019.

\* cited by examiner

ACTIVE MAGNETIC REGENERATIVE PROCESSES AND SYSTEMS EMPLOYING HYDROGEN AS HEAT TRANSFER FLUID AND PROCESS GAS

CROSS REFERENCE TO RELATED APPLICATIONS

This application claims the benefit of U.S. Provisional Application No. 62/477,928, filed Mar. 28, 2017, which is herein incorporated by reference in its entirety.

ACKNOWLEDGMENT OF GOVERNMENT SUPPORT

This invention was made with government support under Contract No. DE-AC05-76RL01830 awarded by the U.S. Department of Energy. The government has certain rights in the invention.

BACKGROUND

It is well known that several types of liquefiers use compression and expansion of the same gas as the internal heat transfer gas and the process gas. For example, in a simple Linde cycle liquefier, a gas to be liquefied is compressed to high pressure near room temperature followed by rejection of the heat of compression into an ambient heat sink. The compressed gas is cooled in a counter-flow heat exchanger to a colder temperature near but higher than the liquefaction temperature of the gas before it is isenthalpically expanded to a low pressure such that a portion of the gas liquefies. The vapor fraction of the cold gas is returned through the counterflow heat exchanger to the suction side of the compressor. The liquid yield in the Linde cycle is relatively small and its FOM, a measure of liquefier efficiency, may only be about 0.10. The mass flow of the gas that is liquefied is made-up at the suction side of the compressor by a feed gas supply input. Other more efficient liquefier designs such as the Claude-cycle or Collins-cycle are significantly more complex than the Linde cycle and can achieve FOMs as high as 0.35 by using the working gas both as the heat transfer gas and the process gas. There are several gas cycle refrigerators that are used as liquefiers where the heat transfer gas or working gas producing the cooling is separate from the process gas that is different from the heat transfer gas. A good example is a pulse tube refrigerator with helium gas as its working refrigerant gas and internal heat transfer gas which is also used to cool and liquefy process gases such as nitrogen or hydrogen through external, separate process gas heat exchangers. To date active magnetic regenerative refrigerators (AMRRs) for cryogenic liquefaction use separate heat transfer gas and process gas. For example, in previous magnetocaloric hydrogen liquefier designs, helium gas is used as the heat transfer gas and hydrogen gas is the process stream. Multiple other gases have been suggested as suitable heat transfer gas for higher temperature cryogens. The distinction between working heat transfer gas and process gas is much more obvious in a magnetic cycle because the working refrigerants are solid magnetic materials instead of a gas.

SUMMARY

Disclosed herein is a process for liquefying a hydrogen gas comprising:

introducing a hydrogen heat transfer fluid into an active magnetic regenerative refrigerator apparatus that comprises (i) a high magnetic field section in which the hydrogen heat transfer fluid flows from a cold side to a hot side through at least one magnetized bed of at least one magnetic refrigerant, (ii) a first no heat transfer fluid flow section in which the bed is demagnetized, (iii) a low magnetic field or demagnetized section in which the hydrogen heat transfer fluid flows from a hot side to a cold side through the demagnetized bed, and (iv) a second no heat transfer fluid flow section in which the bed is magnetized;

continuously introducing the hydrogen heat transfer fluid from the cold side of the low magnetic field or demagnetized section into the cold side of the high magnetic field section;

continuously separating a portion of the cold hydrogen heat transfer fluid flowing from the cold side of the low magnetic field or demagnetized section into an expander; and isenthalpically expanding the separated portion of the hydrogen heat transfer fluid to produce liquefied hydrogen.

Also disclosed herein is a system comprising:

an active magnetic regenerative refrigerator apparatus that comprises (i) a high magnetic field section in which a hydrogen heat transfer fluid can flow from a cold side to a hot side through at least one magnetized bed of at least one magnetic refrigerant, (ii) a first no heat transfer fluid flow section in which the bed can be demagnetized to cool the magnetic refrigerant by the magnetocaloric effect, (iii) a low magnetic field or demagnetized section in which the hydrogen heat transfer fluid can flow from a hot side to a cold side through the demagnetized bed, and (iv) a second no heat transfer fluid flow section in which the bed can be magnetized to heat the magnetic refrigerants by the magnetocaloric effect;

a first conduit fluidly coupled between the cold side of the low magnetic field or demagnetized section and the cold side of the high magnetic field section; and a second conduit fluid coupled to the first conduit, an expander and at least one liquefied hydrogen storage module (e.g., a vessel).

Further disclosed herein is a method for making a magnetic refrigerant composition, comprising:

contacting magnetic refrigerant material particles having a largest cross section dimension of up to 250 μm with a binder;

curing the binder; and bonding an ortho $H_2$ to para $H_2$ catalyst to the bonded magnetic refrigerant material particles.

The foregoing will become more apparent from the following detailed description, which proceeds with reference to the accompanying figures.

DETAILED DESCRIPTION

Figure 1:
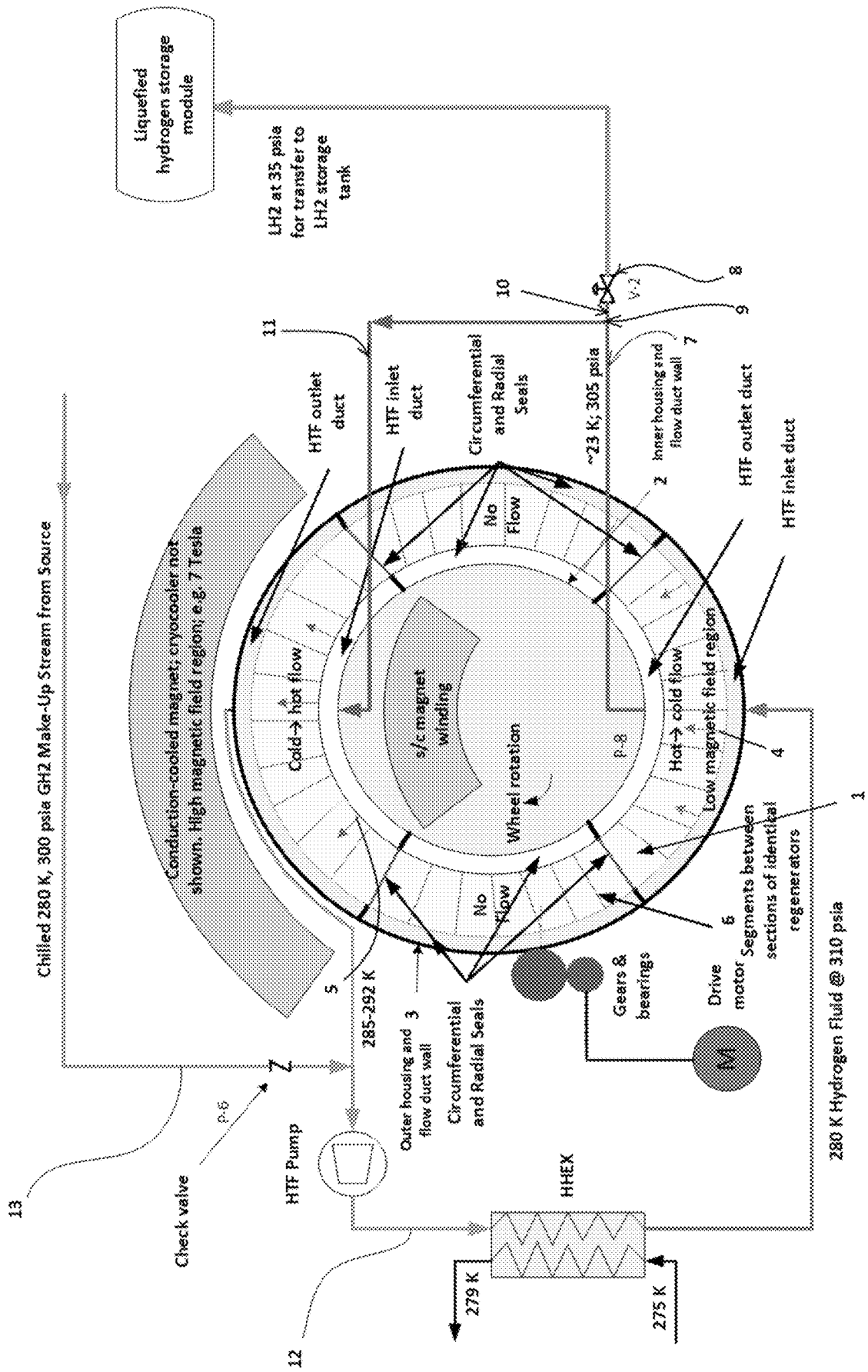
FIG. 1 is a schematic diagram of a cross-section of a rotary wheel embodiment of a single-stage active magnetic regenerative refrigerator (AMRR) with a hydrogen heat transfer fluid and hydrogen process fluid. For example, the embodiment shown in FIG. 1 is a schematic diagram of a single stage AMRR with layered magnetic materials and hydrogen heat transfer fluid to continuously cool and liquefy a hydrogen process stream.

An active magnetic regenerative liquefier (AMRL) may be able to increase the FOM of cryogenic liquefiers by a factor of 2 over comparable conventional gas cycle liquefiers for decreased energy use and capital cost. In current AMRL designs the heat transfer fluid and the process fluid are separated in process heat exchangers and are usually different streams. Such separation results in two sub-systems to cool and liquefy the process gas. Elimination of the process heat exchangers, associated piping, instrumentation, and pumping power would decrease the capital cost and the pumping power.

Disclosed herein are processes and systems that include active magnetic regenerative refrigerators (AMRRs) for liquefying hydrogen process gas. In particular, disclosed herein are processes and systems that use hydrogen gas simultaneously for the process gas and the heat transfer fluid. This decreases the capital cost of the liquefier by eliminating an entire subsystem associated with separating a portion flow of a cold heat transfer fluid to form a bypass stream in counterflow with a hydrogen process fluid to be cooled and liquefied in process heat exchangers. The direct cooling of the hydrogen gas within highly effective active magnetic regenerators will increase the thermodynamic efficiency by use of much larger specific area (e.g., 4,000 to 10,000 $m^2/m^3$) in magnetic regenerators to reduce temperature approach between magnetic refrigerant and hydrogen heat transfer fluid and process fluid. In addition, for the high FOM hydrogen liquefier an ortho-para catalyst could be coated directly onto the magnetic material(s) in the regenerator in a core-shell configuration. For example, a dispersion of fine catalyst particles can be directly adhered to magnetic refrigerant particles via an adhesive. This will not substantially impact the activity of the catalyst or the magnetocaloric effect of the refrigerant while allowing for faster, more efficient conversion of the ortho-hydrogen to para-hydrogen during cooling which is required for efficient hydrogen liquefaction.

In certain embodiments, the process gas and the heat transfer gas both comprise hydrogen. In certain embodiments, the process gas and the heat transfer gas consist essentially of hydrogen (e.g., 98% or 99% hydrogen, with the remainder being non-condensing or freezing impurities such as helium gas at $LH_2$ temperature).

At least three different classes of cryogenic AMRR designs have evolved during the past three decades that include: i) a reciprocating dual regenerator design with stationary superconducting magnet(s) or a stationary dual regenerator design with reciprocating magnets in which the steps of the AMR cycle are executed sequentially in time; ii) a stationary dual magnetic regenerator with a nested set of three concentric superconducting dipole magnets with the outer magnet encompassing both inner magnets which are connected in opposition via a superconducting connection such that rotation of the outer dipole changes the magnetic field in the inner two magnets alternatively from very low field to very high field in which the AMR cycle is also executed sequentially in time, and iii) a rotary wheel design with stationary superconducting magnets. The rotary wheel design with a section of the wheel in high magnetic field and an oppositely located identical section in low magnetic field is inherently a dual regenerator design with continuous execution of all four steps of an AMR cycle at different locations around the rim of the wheel. All of these designs can be used to implement the presently disclosed processes, but we have chosen the rotary wheel design to better illustrate the features of the processes and systems.

All configurations of the AMRR processes and systems have one or more layers of magnetic refrigerants that execute active magnetic regenerative cycles when coupled to a reversing flow of heat transfer gas in the magnetized or demagnetized stages of the cycle. For optimal thermodynamic performance of cryogenic AMRRs with large temperature spans for liquefaction, use of the difference in thermal mass (the mass of refrigerant times it temperature and field heat capacity) of ferromagnetic refrigerants below their respective Curie temperatures enables use of bypass flow of cold heat transfer gas to continuously cool a process stream and increase the FOM of the liquefier. Different mass flow rates of heat transfer gas are required in magnetized vs. demagnetized steps of the AMR cycle due to the difference in total heat capacity at the same temperature in high and low magnetic fields section of the wheel. For 20-40 K below the Curie temperature, the low-field heat capacity is as much as ~10% larger than the high field heat capacity to thermally balance (remove or add the same amount of energy) the dual regenerators during a complete steady-state AMR cycle so a larger flow of heat transfer fluid is required for the hot to cold flow through the demagnetized refrigerant step of the AMR cycle than in the cold to hot flow through the magnetized refrigerant step of the AMR cycle for the optimal performance of the AMRR cycle. The difference in flow rates can be accomplished by separating a portion of the cold heat transfer fluid after the hot-to-cold flow into a bypass stream that is separately returned to the hot side of the AMRR, preferably through the process heat exchanger. In the presently disclosed processes where the heat transfer gas and the bypass gas are common, there is no need for external process heat exchangers because the bypass flow is cold hydrogen fluid (nominally at a pressure such 300 psia which is greater than hydrogen critical pressure of ~180 psia) that is cooled sufficiently below hydrogen's critical temperature of ~33 K by the AMRR so an expansion of the hydrogen fluid to lower pressure than hydrogen's critical pressure results in conversion of the bypass portion of the cold hydrogen to 100 percent liquid hydrogen (no vapor return line is required).

In certain embodiments described herein, the systems and processes can provide refrigeration between 280 K and 20 K with an apparatus utilizing rotary wheel regenerators comprised of layered ferromagnetic materials with Curie temperatures between 293 K and 45 K or between 293 K and 53 K.

To make a highly efficient liquefier for hydrogen, several features should be used in its design. These features include:
  Use an inherently efficient thermodynamic cycle;
  Use an efficient work input device or mechanism;
  Use an efficient work recovery device or mechanism;
  Insure small temperature approaches for heat transfer between or among streams or between solids and streams;
  Use high specific area and highly-effective regenerative heat exchangers;
  Keep pressure drops for heat transfer gas flows and process gas flow very low;
  Invoke low longitudinal thermal conduction mechanisms via material and geometry choices;
  Minimize frictional and parasitic heat leak mechanisms; and Continuous contact between hydrogen and active ortho to para catalysts to ensure continuous conversion from ortho to para during cooling of the fluid.

The processes and systems disclosed herein provide more efficient hydrogen liquefaction in an AMRL by combining hydrogen as the heat transfer fluid and the process gas in one or more AMRR stages (e.g., 1-3) compared to the same AMRR stages where the hydrogen process gas is cooled and liquefied separately from the magnetic regenerators in the AMRR stages. In the common hydrogen fluid design presently disclosed herein, the magnetic regenerators have 2-5 times more effective heat transfer than in counterflowing process heat exchangers although both AMRL designs have continuous cooling of the hydrogen from ~280 K to ~23 K for high FOM. The AMRL with common hydrogen streams as presently disclosed herein has fewer components as well because the separate process heat exchangers are eliminated. An AMRL disclosed herein spanning from ~280 K to ~23 K can have designs such as 3 AMRR stages with spans of ~280 K to ~120 K (8 refrigerants), ~120 K to ~50 K (3 refrigerants), and ~50 K to ~23 K (2 refrigerants) or alternatively 1 AMRR stage with 13 refrigerants). The ability to continuously cool a single hydrogen process stream from near room temperature to its liquefaction temperature uniquely creates a magnetocaloric hydrogen liquefier (MCHL) [also called an active magnetic regenerative liquefier (AMRL)] with much higher FOM than conventional gas-cycle liquefiers such as a Claude cycle design that do not have the feature of bypass flow. In such AMRL designs rejection and absorption of heat are achieved by the temperature increase or decrease of magnetic refrigerants in regenerators upon isentropic magnetization or demagnetization combined with reciprocating flow of heat transfer gas (hydrogen herein).

Certain embodiments of the novel processes and systems include the use of two dual rotary sets of identical layered active magnetic regenerators with refrigerant masses sized to match to the cooling requirements of $GH_2$ with hydrogen as a circulating common heat transfer gas to continuously and simultaneously execute the 4-steps of the AMR cycles at different sections of rotating AMRR; i.e. as several regenerator segments in the wheel rim are magnetized in the high magnetic field region of a rotary AMRR, several others are demagnetized in the low-magnetic field region. The regenerators of the rotary configuration in the two magnetic field regions are oriented opposite to each other such that circulating hydrogen heat transfer gas flows from hot-to-cold temperatures in the demagnetized regenerator segments while a different portion of hydrogen heat transfer fluid simultaneously flows from cold-to-hot temperatures in the magnetized regenerator segments. For example, several segments of layered magnetic refrigerants fabricated into tapered regenerators attached to a rotating wheel rim are magnetized simultaneously while another equal number of identical regenerator segments are demagnetized. Similarly, the continuous flow of hydrogen heat transfer gas establishes the hot-to-cold flow in several demagnetized regenerator segments at the same time as hydrogen heat transfer gas in an opposite part of the rotational path creates the cold-to-hot flow in several magnetized regenerator segments. The "several" regenerator segments executing the different steps of the AMR cycle comprise the "set". Each regenerator in a given 'set' at any location around the wheel has an identical regenerator in another 'set' executing the opposite step of the AMR cycle 180 degrees around the rotating wheel. In this instance, there are several (e.g., 36) "dual" regenerators segments in the rotary wheel executing the opposite step in the AMR cycle (see FIG. 1).

An AMR cycle has four steps that are being continuous executed at some location around the rim of the wheel: magnetization with no heat transfer fluid flow of one set of active magnetic regenerator segments as they move from low field to high field section of the wheel in FIG. 1; flow of heat transfer fluid (hydrogen in this case) from cold-to-hot through the magnetized regenerators; demagnetization of this same set of segments of regenerators while there is no flow of heat transfer fluid; and flow of heat transfer fluid from hot-to-cold through the segments of demagnetized regenerators. FIG. 1 illustrates that four sets of layered regenerators in the rim of the wheel in the AMRR stage undergo the four steps of the AMR cycle, but 180 degrees out of phase with a similar set of identical regenerator beds. After the AMRR in FIG. 1 has executed several hundred cycles at 1-2 Hz, i.e. in 10-15 minutes, the layered active magnetic regenerators in the rim of the wheel and throughout the other AMRR subsystems in FIG. 1 will have achieved constant steady-state temperatures depending upon the location in the AMRR system. Each regenerator segment will have dynamic temperatures as the segment rotates through the different steps of the AMR cycle. There will be a temperature gradient across each layer of magnetic refrigerant that will span from the average $T_{HOT}$ to the average $T_{COLD}$ along the flow axis of the rotating active magnetic regenerators, i.e., in the radial or axial directions through the rim of the wheel in FIG. 1.

Figure 2:
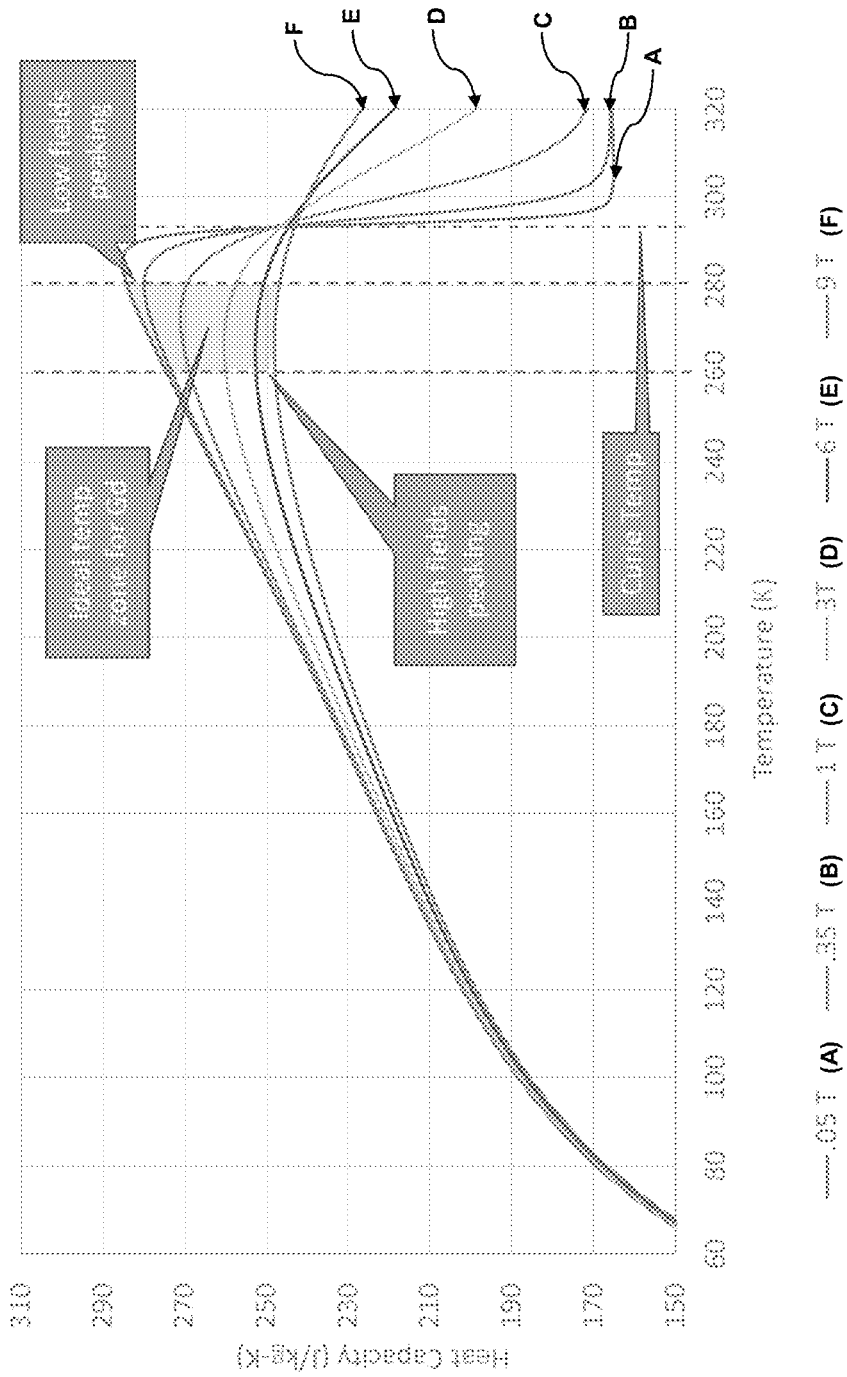
FIG. 2 is a graph showing temperature and field dependent heat capacity of ferromagnetic refrigerants.

The magnetic refrigerants in the AMR beds have a difference in thermal mass which is the product of heat capacity per unit mass times the mass of magnetic refrigerant (or just heat capacity in this case because the mass of magnetic material in a magnetic regenerator does not depend upon temperature or magnetic field). As illustrated in FIG. 2 the heat capacity of a ferromagnetic material below its Curie temperature (ordering temperature) is smaller in higher magnetic fields than at lower or zero magnetic fields. However, as shown in FIG. 2, this difference reverses in magnitude at the Curie temperature where the heat capacity in higher magnetic fields becomes larger than the heat capacity in low or zero fields. This means the integral of the thermal mass for an AMR cycle spanning from 20-30 K below the Curie temperature to 20-30 K above the Curie temperature increases up to the Curie temperature and then it decreases with increasing temperature. The difference in thermal mass in ferromagnetic refrigerants below their respective Curie temperature creates the need for less hydrogen heat transfer fluid flow rate in the magnetized sector of the rotary AMRR than in the demagnetized sector of a thermally balanced AMR cycle. Therefore, after the hot-to-cold flow of hydrogen through the demagnetized sector of the wheel, the hydrogen stream will be at an average temperature of $T_{COLD}-\Delta T_{COLD}/2$, and can preferably be split into the lesser amount of hydrogen heat transfer fluid required for cold-to-hot flow through regenerator segments in the magnetized wheel sector and a smaller portion of cold hydrogen called bypass flow (so-called because this portion bypasses the cold-to-hot flow through the set of magnetized regenerators). In this embodiment, the cold bypass hydrogen portion at 300 psia is expanded to create $LH_2$ at ~35 psia that is collected in a small storage vessel inside the evacuated cold box for transfer out of the AMRL into an external well-insulated storage tank (Dewar). In the design of the novel processes and systems disclosed the importance of selecting and controlling the hot sink temperature and temperature span for each layer of magnetic refrigerants in the regenerators to maximize the difference in thermal mass (and thereby the amounts of bypass flow) is recognized. First, the dynamic $T_{HOT} \pm \Delta T_{HOT}$ of the outer-most refrigerant in the layered rim of the wheel in FIG. 1 at its maximum during the magnetization step of the AMR cycle is always less than its' Curie temperature. $T_{HOT}$ is the environmental temperature where the heat is dumped. The dynamic $T_{HOT}$ of the outer rim material ranges from $T_{HOT} + \Delta T_{HOTup}$ to $T_{HOT} - \Delta T_{HOTdown}$ during a complete AMR cycle where $\Delta T_{HOTup}$ is the increase in temperature caused by inserting the regenerator into the magnetic field and $\Delta T_{HOTdown}$ is the decrease in temperature from $T_{HOT}$ caused by removing a regenerator segment of the wheel from the magnetic field in the no-flow sector of the rotation. The maximum dynamic $T_{HOT}$ depends on where it is in the cycle, but by design the maximum is $T_{HOT} + \Delta T_{HOT}$. This can be done by setting a fixed heat sink temperature to anchor $T_{HOT}$ which in turn yields the largest difference in thermal mass between high and low magnetic fields. The second aspect of the difference in thermal mass in high and low magnetic fields is that it decreases steadily as the cold temperature in the particular layer of the regenerator decreases below the Curie temperature (s) of the particular layer of magnetic refrigerant. Each independent magnetic refrigerant layer may be referred to herein as a "$j^{th}$ layer". Hence, the $j^{th}$ layer of magnetic materials in a regenerator in the subject AMRL for hydrogen, must operate in temperature spans when magnetized of $T_{HOTj} + \Delta T_{HOTj} \leq T_{Curiej}$ and $T_{COLDj} + \Delta T_{COLDj}$ equal to $\sim 20$ K$<T_{Curiej}$ and when demagnetized, between $T_{HOTj} - \Delta T_{HOTj}$ and $T_{COLDj} - \Delta T_{COLDj}$ which are also $\sim 20$ K apart. $T_{COLDj}$ represents the average cold temperature of the $j^{th}$ slice of the magnetic regenerators at any point in the AMRR as it executes the $j^{th}$ small magnetic Brayton cycle. $\Delta T_{COLDj}$ represents the temperature drop caused by the magnetocaloric effect when the regenerator is removed from the magnetic field. If larger temperature spans with optimum differences in thermal mass are desired (as required for very high FOM), layers of magnetic materials with descending Curie temperatures must be used in the AMRR regenerators.

For example, Gd metal is a ferromagnetic refrigerant that has a Curie temperature of about 293 K and is an option for the outer rim of the disclosed embodiment. With $\sim 6.5$ Tesla magnetic field changes [6.8 T to 0.3 T], the adiabatic temperature change $\Delta T_{HOTup}$ (from low to high field) starting from $\sim 280$ K is about 12-13 K so $T_{HOT} + \Delta T_{HOT}$ during its AMR cycle peaks at 280 K+12 K or 292 K. This temperature is indicated in FIG. 1. The hot heat sink temperature in FIG. 1 enters the heat rejection counterflow heat exchanger at $\sim 275$ K and exits at $\sim 279$ K to continually cool the hydrogen heat transfer and process fluid to $\sim 280$ K before it enters the manifold for the hot-to-cold flow sector of the wheel. During a complete rotation of the wheel in FIG. 1, Gd will be the outermost layer of refrigerant in the rim-shaped layered regenerator and its hot-side temperature will change from $\sim 292$-293 K just as it enters the high field region to $\sim 280$ K as it leaves the high field region due to flow of hydrogen heat transfer fluid continuously entering the hot side of the wheel at $\sim 280$ K. A similar shaped dynamic temperature cycle at the colder side of the Gd layer of the regenerator is executed with an average $T_{COLD}$ of $\sim 260$ K. A similar dynamic temperature cycle is executed by different layers of magnetic refrigerants in the rim of the wheel to establish average temperatures of 260 K to 240 K for the second layer ($Gd_{0.83}Dy_{0.17}$ in this embodiment) adjacent to the Gd layer, and 240 K to 220 K for the third layer and so on through the multiple layers that comprise the rim of the rotating wheel for a given stage of the AMRL. The temperature span of each layer is the difference between the average $T_{HOT}$ and the average $T_{COLD}$ or about 20 K per layer. Because the thermal load of each colder layer of magnetic refrigerant is smaller than the next warmer layer, the colder layer has less mass of refrigerant than the adjacent warmer layer and therefore requires less hydrogen heat transfer fluid ranging from the maximum in the outer-most layer to lesser flows in each colder layer. To adjust the proper flows per layer, a portion of the heat transfer fluid flowing from an outlet from the $j^{th}$ layer in the hot-to-cold flow region is diverted via hermetic diversion flow channels around the circumference of the wheel into the cold-to-hot flow of heat transfer fluid inlet to the $j^{th}$ layer in the cold-to-hot flow region with a controllable diversion valve to provide the optimum lesser flow for the next colder demagnetized layer and simultaneously provide optimum flow into the next hotter magnetized layer.

For example, in the rotary wheel embodiment, Gd is the outer layer and $Gd_{0.83}Dy_{0.17}$ is its adjacent colder layer. The mass of Gd is greater than that of $Gd_{0.83}Dy_{0.17}$ so after the optimum flow of hydrogen heat transfer fluid passes through Gd in the hot-to-cold flow, a portion of it ($\sim 10$-$\sim 50\%$) is separated as to provide optimum flow of heat transfer and bypass fluid into the $Gd_{0.83}Dy_{0.17}$ layer. The portion of heat transfer fluid split off is the diversion flow from the thin interconnection gaps between the two layers mounted into the G-10 regenerator housing. This flow is diverted circumferentially in a hermetic channel to the same gap between the $Gd_{0.83}Dy_{0.17}$ layer and the Gd layer in the magnetized region of the wheel. The amount of heat transfer fluid coming out of the $Gd_{0.83}Dy_{0.17}$ layer is less than the optimum flow for the hotter Gd layer so the diversion flow is added to it for optimum flow of heat transfer fluid into the Gd layer during the cold-to-hot flow. The same thing happens between each pair of adjacent successively colder layers until the innermost layer.

For example, a first diversion flow comes from the small connection gap between a first layer and a second layer in the demagnetized region to between a second layer and a first layer in the magnetized region. The bypass hydrogen fluid is a portion of the hydrogen fluid stream that continues through all the layers to be separated into the expander after the hydrogen exits the coldest layer of magnetic refrigerant.

For each $j^{th}$ layer of magnetic refrigerant, the value of $T_{HOTj}$ is the average of the dynamic temperature at the edge of the $j^{th}$ layer in the rim of the wheel illustrated in FIG. 1. The temperatures in/out of each layer through a multi-layer regenerator can be measured by tiny temperature sensors (such as a #36 gauge twisted-pair type E thermocouples) inserted into the regenerator during fabrication of the monolithic regenerators. Measurements during rotation of the wheel will show the small local magnetic Brayton cycles of each refrigerant that are coupled into an AMR cycle by flow of the hydrogen heat transfer fluid.

Illustrative embodiments of the AMRR stages are rotary designs with sets of dual regenerators that are simultaneously executing the four steps of the AMR cycle at all times during the rotational cycle of 1 to 2 Hertz. One embodiment shown, for example, in FIG. 1, has four different regions in the rotary design which allows continuous flow of the hydrogen heat transfer fluid through a set of demagnetized regenerators (a set of identical regenerators are in the low/zero field region) and some magnetized regenerator beds (the identical regenerators in the high field region) and no flow through the regions where the magnetic field is either increasing or decreasing. The $LH_2$ flow is continuously produced from the expanded bypass portion of hydrogen heat transfer fluid flow, and is compensated for by a make-up stream flowing from a hydrogen gas source at $\sim 280$ K (which may be a pre-purified hydrogen source) into the hydrogen heat transfer fluid cycling flow just before the circulation pump for the combined hydrogen heat transfer and process fluid.

Certain embodiments of the novel processes and systems use layered active magnetic regenerators for enabling slightly larger differences as 25-30 K between the average temperatures $T_{HOT}$ and $T_{COLD}$ necessary to use fewer layers in hydrogen AMRL designs with higher or lower pressure than the 300 psia illustrated in FIG. 1. The magnetic regenerators are fabricated with multiple longitudinally or radially-layered magnetic refrigerants located such that the Curie temperature of each refrigerant is above the average AMR-cycle hot temperature $T_{HOT}$ by $\Delta T_{HOT}$ at that axial location in the regenerators in steady-state operation to maximize thermal mass differences and thereby percentage of bypass flow. All the refrigerants in the AMRR individually execute small magnetic Brayton cycles as they are alternately magnetized and demagnetized by the magnetic field and connected together from $T_{HOT}$ to $T_{COLD}$ by the flowing hydrogen heat transfer gas. This coupling allows the overall temperature span of an AMRR to be many times adiabatic temperature changes from the magnetocaloric effect of each magnetic refrigerant. The thermomagnetic properties of properly layered refrigerants must simultaneously have entropy flows that satisfy the 2nd law of Thermodynamics (i.e., $\Delta T_{COLDdown} = \Delta T_{HOTup}$ $(T_{COLD}/T_{HOT})$ with allowance for generation of irreversible entropy and effects of parasitic heat leaks and bypass flow.

Figure 3:
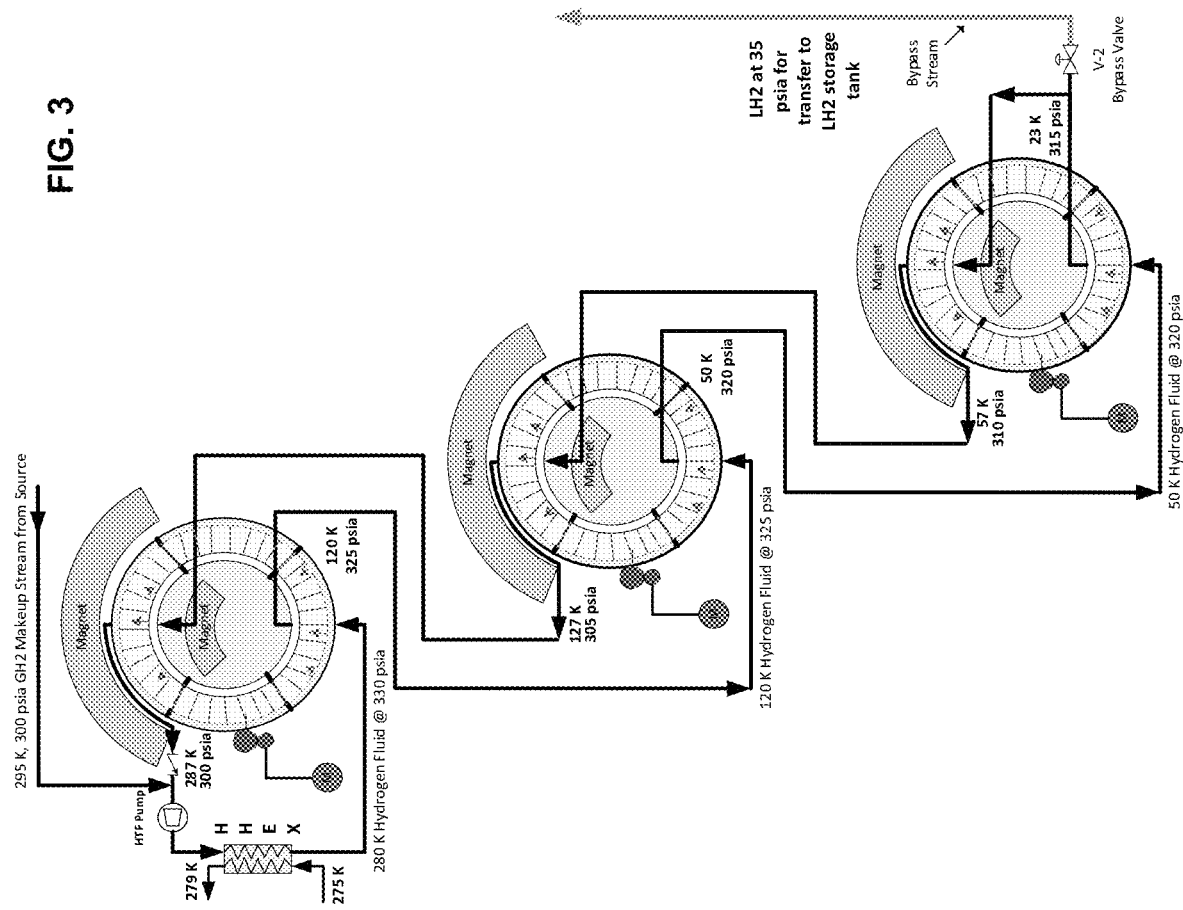
FIG. 3 is a schematic diagram of an active magnetic regenerative liquefier (AMRL) that includes more than one single-stage active magnetic regenerative refrigerator (AMRR) coupled together in series.

In certain embodiments, the active magnetic regenerative refrigerator apparatus includes 1 to 16 layers, more particularly 1 to 13 layers, of compositionally distinct magnetic refrigerant materials in a single stage that can, for example, span from ~280 K to ~20 K for production of $LH_2$. In other embodiments, more than one AMRR stage can be connected in series as shown, for example, in FIG. 3. For instance, two AMRR stages connected in series can span from ~280 K to ~120 K with 8 layers of different refrigerants in the first stage and from ~120 K to ~20 K with 5 layers of different refrigerants in the second stage with continuous flow of hydrogen heat transfer fluid for production of $LH_2$.

The active magnetic regenerative refrigerator apparatus comprises a composition (e.g., a composite) that includes at least one magnetic refrigerant material and at least one ortho $H_2$ to para $H_2$ catalyst. In certain embodiments, the composition comprises magnetic refrigerant material particles (e.g., spheres) having a largest cross section dimension of up to 250 μm, and a binder interspersed with the particles, wherein the ortho $H_2$ to para $H_2$ catalyst is bonded to the particles and/or the binder. In certain embodiments, the composition comprises magnetic refrigerant material particles having a largest cross section dimension of up to 250 μm, and ortho $H_2$ to para $H_2$ catalyst particles having a largest cross section dimension of less than 5 μm.

In certain embodiments, the magnetic refrigerant material is in the form of particles having a largest cross section dimension of up to 250 μm. For example, the magnetic refrigerant material particles may have a diameter of 150 to 250 μm. In certain embodiments, the magnetic refrigerant material particles may have a diameter of 100 to 250 μm. The particles may be spheres, non-spherical particles or powders, or rods. The particle may be of composite construction and is not necessarily a pure substance. In certain embodiments, the magnetic refrigerant particles may be spheres or similar high surface area per volume geometries (e.g., specific areas of 5,000 to 10,000 m² per m³) such as parallel sheets or perforated plates.

The binder is a material that is disposed among and/or between the magnetic refrigerant particles without reducing the heat transfer rate to the particle while only slightly increasing the pressure drop, i.e., 1%, for low pressure-drop hydrogen flow through the regenerator layers. The binder provides structural integrity to each magnetic refrigerant composition so that it can be formed into layers. The binder may include at least one polymer selected from polyethylene, ethylene vinyl acetate, polypropylene, polystyrene, polycarbonate, an epoxy resin, or a polyurethane resin. The binder may be an adhesive agent. In certain embodiments, the binder comprises at least one curable epoxy resin that is applied in dilute solutions of the epoxy-hardener mixture diluted by 10:1 times by volume with a volatile solvent such as acetone. In certain embodiments, the magnetic refrigerant particles may be dispersed in a matrix of the binder.

An optimal loading of a highly active catalyst with the magnetic refrigerants enables continual ortho-to-para conversion of hydrogen at the highest possible temperature which enhances liquefier efficiency. In certain embodiments, the catalyst loading is 0.1-10 wt %, more particularly 0.1-5 wt %, based on the weight of the refrigerant per layer. One of the significant benefits of the systems and processes disclosed herein is elimination of the external counterflow process gas heat exchangers by excellent internal heat exchange inherent in very high surface area magnetic regenerators.

In certain embodiments, the magnetic refrigerant material particles are contacted with the binder. The binder is then cured. The cured binder connects the particles at their contact points but retains porosity for flow of hydrogen heat transfer fluid through the bed with low pressure drop. To avoid reducing thermal conductance between the hydrogen heat transfer fluid and the particles, any coating on the particles should be thin (e.g., less than 5 microns thick, more particularly less than 2 microns thick). After the binder is cured, the ortho-to-para catalysts are separately bonded to the high surface area of the resulting bonded magnetic refrigerant material particles to avoid reducing the activity of the catalysts. The catalyst may be bonded to the particles via physical adsorption means that does not reduce the catalyst activity; e.g., this could be by a short thermal diffusion process after the initial binder is added and cured on the magnetic particles. It can also be done by washcoating as described below.

Illustrative ortho $H_2$ to para $H_2$ catalysts for use in the bypass flow process heat exchangers include, but are not limited to, activated carbon; ferric oxide ($Fe_2O_3$); chromic oxides ($Cr_2O_3$ or $CrO_3$); Ni metal and Ni compounds ($Ni^{2+}$); rare earth metals and oxides such as $Gd_2O_3$, $Nd_2O_3$, and $Ce_2O_3$; Pt; and Ru. Activated carbon and ferric oxide are particularly preferred. The catalysts can be directly coated onto the magnetic refrigerant materials in the regenerators. If the magnetocaloric materials in the regenerators are not secured in place by an epoxy or other coating method, a small amount of catalysts can be mixed in with the active magnetocaloric materials. The catalyst particles may be the same or similar in size and shape as the magnetocaloric materials, or the catalyst particles may be smaller in size but similar in shape as the magnetocaloric materials. If the magnetocaloric materials are secured in place for example by an epoxy process then the catalyst will need to be coated onto the surface of the materials after the diluted epoxy is applied and cured. This can be done using standard washcoating process followed by a reduction and mild oxidation as needed. For example, a solution of iron hydroxide [Fe(OH)$_3$] in a basic solution (pH 8-10), at the desired weight percent, can be wash coated onto the magnetic refrigerant material. The coated materials can be dried at mild temperatures (<100-120° C.) which dehydrates to $Fe_2O_3$. For this catalyst no reduction is needed. Similar washcoating techniques can be used for the other catalysts. However, the solvents, drying temperatures, and, if required, reduction procedures must be compatible with the binder and the magnetocaloric materials. For example, washing with $NH_3BH_3$, $NaBH_4$ or $N_2H_2$ can be used to reduce the metal oxides to metals.

Gadolinium is an excellent magnetic refrigerant and has been generally accepted as the reference material against which other refrigerants are compared. It has a simple ferromagnetic ordering temperature of ~293 K and exhibits an adiabatic temperature change of ~2 K/Tesla over practical magnetic field strengths (up to ~8 T). It also has a large difference in field-dependent thermal mass just below its Curie temperature as shown in FIG. 2. Introduction of alloying additions of another lanthanide metal reduces the magnetic-ordering temperature of Gd without much effect on the total magnetic moment per unit volume and the change in magnetization with temperature near a sharp ordering temperature.

For example, homogeneous alloys of Gd with other rare earth metals (Tb, Er, Dy, Ho) or Y make superior magnetic refrigerants. Some elemental rare earth materials such as Ho and Er have more complex magnetic ordering phenomenon but when alloyed with Gd these effects tend to be reduced at high magnetic fields to provide acceptable ferromagnetic or heliomagnetic refrigerants. The addition of non-magnetic Y to Gd forms a homogeneous alloy with a reduction in adiabatic temperature change compared to Gd but simultaneously decreases the magnetic ordering temperature and exhibits simple ferromagnetism down to about 230 K.

Key features or suitable refrigerant materials include:
Use ferromagnetic materials that operate below their Curie temperature throughout their entire AMR cycle;
Maintain average $T_{HOT}$ at least $\Delta T_{HOT}$ below the Curie temperature of the $j^{th}$ layer of magnetic material in a regenerator; this applies to each layer of magnetic material in the regenerator with correspondingly lower cycle temperatures;
Average temperature difference between $T_{HOT}$ and $T_{COLD}$ of each layer of magnetic refrigerant should be ~20 K per layer;
Spanning from 280 K to 120 K in one AMRR stage requires 8 refrigerants to be combined into optimally layered regenerators.
Layering must have smooth flows of energy and entropy at transitions between layered refrigerants along the longitudinal axis of the regenerator.

Illustrative magnetic refrigerants include those shown below in Table 1.

| Material | Operating Temperature Span K | Ordering Temperature K |
|---|---|---|
| Gd | 280-260 | 293 |
| $Gd_{0.90}Y_{0.10}$ | 260-240 | 274 |
| $Gd_{0.30}Tb_{0.70}$ | 240-220 | 253 |
| $Gd_{0.69}Er_{0.31}$ | 220-200 | 232 |
| $Gd_{0.02}Tb_{0.98}$ | 220-200 | 233 |
| $Gd_{0.32}Dy_{0.68}$ | 200-180 | 213 |
| $Gd_{0.66}Y_{0.34}$ | 200-180 | 213 |
| $Gd_{0.39}Ho_{0.61}$ | 180-160 | 193 |
| $Gd_{0.59}Y_{0.41}$ | 180-160 | 193 |

-continued

| Material | Operating Temperature Span K | Ordering Temperature K |
|---|---|---|
| $Gd_{0.15}Dy_{0.85}$ | 180-160 | 193 |
| $Gd_{0.42}Er_{0.58}$ | 160-140 | 173 |
| $Gd_{0.27}Ho_{0.73}$ | 160-140 | 173 |
| $Gd_{0.16}Ho_{0.84}$ | 140-120 | 153 |
| $Gd_{0.34}Er_{0.66}$ | 140-120 | 152 |
| $Gd_{0.23}Er_{0.77}$ | 120-100 | 132 |
| $(Ho_{0.80}Gd_{0.20})Co_2$ | 120-100 | 130 |
| $Ho_{0.90}Gd_{0.10}Co_2$ | 100-80 | 110 |
| $Ho_{0.95}Gd_{0.05}Co_2$ | 80-60 | 90 |
| $Gd_{0.5}Dy_{0.5}Ni_2$ | 60-40 | 70 |
| $DY_{0.75}Er_{0.25}Al_2$ | 40-20 | 50 |
| $(Gd_xEr_{1-x})Al_2$ | 150-10 | 168 (x = 1) tp 15 (x = 0) |

As shown in FIG. 1, the rotary AMRR apparatus includes an annular bed 1 of at least several porous magnetic refrigerant material-containing compositions. The bed 1 may include a plurality of layers (e.g., 13, or 14, or at least 5, or at least 8) wherein each layer is compositionally distinct from each other layer. The magnetic refrigerant material-containing composition may include ortho-to-para catalysts bonded to magnetic refrigerant material surfaces for maximum catalytic activity at the highest possible temperatures in the regenerators. It is the continuous range of temperatures from 280 K to 20 K in the layered regenerator where any cooled ortho hydrogen is converted to para hydrogen to maintain the equilibrium ratio of ortho to para hydrogen (75:25 ortho:para at 280 K to 0.2:99.8 at 20 K).

The rotary AMRR apparatus that is physically the same everywhere in the wheel is operationally divided into four sections during execution of the AMR cycle (listed in order of wheel rotation): (i) a high magnetic field section in which the hydrogen heat transfer fluid (e.g., heat transfer gas) flows from a cold side to a hot side through the magnetized regenerators(s) bed(s), (ii) a first no heat transfer fluid (e.g., gas) flow section in which the regenerator(s) bed(s) are demagnetized, (iii) a low magnetic or demagnetized field section in which the hydrogen heat transfer fluid (e.g., gas) flows from a hot side to a cold side through the demagnetized regenerator(s) bed(s), and (iv) a second no hydrogen heat transfer fluid (e.g., gas) flow section in which the regenerator(s) bed(s) are magnetized. Transverse and circumferential seals are provided in the no heat transfer fluid flow sections to prevent undesirable hydrogen heat transfer fluid flow. The magnetic refrigerant beds or segments may be divided into compartments wherein the compartments contain layered magnetic refrigerants (e.g., 13 or 14 layers) identical to those in other segments around the wheel rim.

The rotary AMRR apparatus includes a rotating wheel that includes an inside hollow annular rim 2 (inner housing and flow duct wall) and an outside hollow annular rim 3 (outer housing and flow duct wall). A hot hydrogen heat transfer fluid (HTF) is introduced into the outside rim 3 of the rotary AMRR apparatus via an HTF inlet duct provided in the low magnetic or demagnetized field section (iii). The hot HTF in the outside rim 3 has a steady-state circumferentially average temperature that, for example, may be 280 K. This is a fixed temperature that is controlled by adjusting a chiller temperature feeding the heat rejection heat exchanger that insures hydrogen fluid enters the outer rim of the demagnetized regenerator compartments in the hot to cold flow region of the wheel at a temperature ~12-13 K below the Curie temperature of Gd, the outer most layer in the wheel rim. However, the local temperature at a given time and location in the AMR cycle may differ from the steady-state circumferentially average temperature. The hot HTF flows in a radial direction through the demagnetized bed in the low magnetic field region, cooling the hydrogen combined process and heat transfer fluid. Optimum flow of cooled heat transfer fluid exits the low magnetic or demagnetized field section (iii) via an HTF outlet duct and into the inside rim 2. The HTF radial flow is shown by the arrows 4 in the low magnetic or demagnetized field section (iii). The cold HTF in the inside rim 2 has a steady-state circumferentially average temperature that, for example, may be ~20-23 K. However, the local temperature at a given time and location in the AMR cycle may differ from the steady-state circumferentially average temperature.

The inside rim 2 is fluidly coupled via an HTF outlet duct and a conduit 7 to a conduit junction 9. The hydrogen heat transfer fluid exiting the cold side of the low magnetic or demagnetized field section is at a temperature of 20 to 23 K and a pressure of about 300 psia. The conduit junction is fluidly coupled via a conduit 10 to an expander 8. A bypass portion of the hydrogen heat transfer fluid is separated into the expander 8 via conduit 10. The expander 8 isenthalpically expands the bypass portion of the hydrogen heat transfer fluid from ~300 psia to ~15-35 psia, more particularly 35 psia, to produce liquefied hydrogen ($LH_2$). The liquefied hydrogen exiting the expander is at a temperature of 20 to 25 K, more particularly 23 K, and a pressure of 15 to 35 psia, more particularly 35 psia. In certain embodiments, the $LH_2$ can be delivered directly to a storage tank, for example, a storage tank external of the system. The flow at the junction 9 may be controlled a $LH_2$ flow control valve (not shown). In certain embodiments, 3-12%, particularly less than 12%, more particularly less than 8%, and most particularly 6%, of the hydrogen heat transfer fluid is separated as bypass flow to the expander 8. The remaining hydrogen heat transfer fluid is introduced as the cold flow into the inside rim 2 at the high magnetic field section (i) via conduit 11 and an HTF inlet duct.

The cold HTF flows in a radial direction through the high magnetized bed, heating the HTF. The hot HTF exits the high magnetic field section (i) via an HTF outlet duct and into the outside rim 3. The HTF radial flow is shown by the arrows 5 in the high magnetic field section (i). The hot HTF exits the high magnetic field section (i) and is introduced via a conduit 12 into a circulation pump and then into a hot heat exchanger (HHEX). The HHEX cools the heat transfer fluid down to a suitable temperature close to 280 K for introduction as the hot flow into the low magnetic or demagnetized field section (iii). The cooling heat transfer fluid in the HHEX typically is a water/glycol mixture chilled to ~278 or 275 K to ensure the hydrogen HTF is at 280 K before it flows in the hot to cold flow section of the wheel. In certain embodiments, the hydrogen heat transfer fluid enters to HHEX at 292 to 286 K and 290 to 300 psia. In certain embodiments, the hydrogen heat transfer fluid entering as the hot flow into the low magnetic or demagnetized field section (iii) is at 280 K and 300 psia.

A hydrogen gas source is also provided. In the embodiment shown in FIG. 1, hydrogen gas ($GH_2$) from a hydrogen gas source is introduced via conduit 13 into the hydrogen heat transfer fluid flowing from the hot side of the high magnetic field section into the hot side of the low magnetic or demagnetized field section. In certain embodiments, the amount of $GH_2$ introduced via conduit 13 compensates the mass flow in the hydrogen heat transfer fluid cycle for the amount diverted for $LH_2$ production. In certain embodiments, the $GH_2$ is at 280 K and 300 psia.

In certain embodiments, the rim of the wheel has multiple layers (e.g., 16, more particularly 14 or 13) of different ferromagnetic refrigerants with Curie temperatures about 20 K apart between successively adjacent layers in the direction from inner layer to the outer layer with the coldest layer in the inside most layer on the rim of the wheel to have Curie temperatures from ~293 K to ~33 K. In certain embodiments, the magnetic refrigerant materials are arranged in descending order from the outer layer to the inner layer according to Curie temperatures. The outer layer is near room temperature and rejects heats into a thermal sink and the inner-most layer cools the hydrogen fluid to slightly below ~23 K such that 6-10% bypass portion, for example ~10%, bypass portion of hydrogen can be isenthalpically expanded to produce $LH_2$ at ~35 psia and also absorb the small intrinsic parasitic heat leaks into the AMRR.

The hydrogen gas source may be, for example, an electrolyzer, a steam methane reformer, or a methane autoreformer. Typical hydrogen feedstock pressure from an electrolyzer, a steam methane reformer, or a methane autoreformer is about 300 psia. The critical pressure of hydrogen is 12.2 atm or 197.2 psia so the hydrogen is a single-phase fluid at 300 psia. This pressure is an excellent heat transfer fluid pressure for an AMRR from a mechanical design perspective. In the AMRR of the presently disclosed process the hydrogen 'fluid' is both the heat transfer medium and the process medium. The hydrogen is efficiently cooled in the highly effective dual magnetic regenerators of the AMRR to a cold temperature of ~23 K selected such that expansion of the bypass portion of the heat transfer stream from ~300 psia to ~35 psia will produce 100% $LH_2$ that is transferred to a $LH_2$ storage tank at a plant. Hydrogen as a heat transfer gas is superior to helium gas so the AMRR thermodynamic performance (FOM) in the presently disclosed processes should also be improved. The mass flow rate of the $LH_2$ leaving the AMRR is continuously made up from the external hydrogen source at the inlet to the heat transfer gas pump at room temperature.

Certain embodiments of the processes and system disclosed herein described in the following numbered clauses:

1. A process for liquefying a hydrogen process gas comprising:

introducing a hydrogen heat transfer fluid into an active magnetic regenerative refrigerator apparatus that comprises (i) a high magnetic field section in which the hydrogen heat transfer fluid flows from a cold side to a hot side through at least one magnetized bed of at least one magnetic refrigerant, (ii) a first no heat transfer fluid flow section in which the bed is demagnetized, (iii) a low magnetic or demagnetized field section in which the hydrogen heat transfer fluid flows from a hot side to a cold side through the demagnetized bed, and (iv) a second no heat transfer fluid flow section in which the bed is magnetized;

continuously introducing the hydrogen heat transfer fluid from the cold side of the low magnetic or demagnetized field section into the cold side of the high magnetic field section;

continuously diverting a portion of the hydrogen heat transfer fluid flowing from the cold side of the low magnetic or demagnetized field section into an expander; and isenthalpically expanding the diverted portion of the hydrogen heat transfer fluid to produce liquefied hydrogen.

2. The process of clause 1, wherein the diverted portion constitutes 3 to 12% of the total hydrogen heat transfer fluid exiting the cold side of the low magnetic or demagnetized field section.

3. The process of clause 1 or 2, wherein the magnetic refrigerant operates at or below its Curie temperature throughout an entire active magnetic regeneration cycle.

4. The process of any one of clauses 1 to 3, wherein the process provides a figure of merit (FOM) of at least 0.5.

5. The process of any one of clauses 1 to 4, wherein the active magnetic regenerative refrigerator apparatus includes a plurality of magnetic refrigerant layers.

6. The process of clause 5, wherein the active magnetic regenerative refrigerator apparatus includes 1 to 16 layers of compositionally distinct magnetic refrigerant materials.

7. The process of any one of clauses 1 to 6, wherein the active magnetic regenerative refrigerator apparatus comprises a composition that includes at least one magnetic refrigerant material and at least one ortho $H_2$ to para $H_2$ catalyst.

8. The process of clause 7, wherein the magnetic refrigerant material is in the form of particles having a largest cross section dimension of up to 250 μm.

9. The process of clause 7, wherein the composition comprises magnetic refrigerant material particles having a largest cross section dimension of up to 250 μm, and a binder interspersed with the particles, wherein the ortho $H_2$ to para $H_2$ catalyst is bonded to the particles and/or the binder.

10. The process of clause 7, wherein the composition comprises magnetic refrigerant material particles having a largest cross section dimension of up to 250 μm, and ortho $H_2$ to para $H_2$ catalyst particles having a largest cross section dimension of less than 5 μm.

11. The process of any one of clauses 8 to 10, wherein the magnetic refrigerant material particles have a diameter of 150 to 250 μm.

12. The process of clause 9, wherein the binder comprises at least one epoxy material.

13. The process of any one of clauses 1 to 12, wherein the magnetic refrigerant material is selected from Gd, $Gd_{0.90}Y_{0.10}$, $Gd_{0.30}Tb_{0.70}$, $Gd_{0.69}Er_{0.31}$, $Gd_{0.02}Tb_{0.98}$, $Gd_{0.32}Dy_{0.68}$, $Gd_{0.66}Y_{0.34}$, $Gd_{0.39}Ho_{0.61}$, $Gd_{0.59}Y_{0.41}$, $Gd_{0.15}Dy_{0.85}$, $Gd_{0.42}Er_{0.58}$, $Gd_{0.27}Ho_{0.73}$, $Gd_{0.16}Ho_{0.84}$, $Gd_{0.34}Er_{0.66}$, $Gd_{0.23}Er_{0.77}$, $(Ho_{0.80}Gd_{0.20})Co_2$, $Ho_{0.90}Gd_{0.10}Co_2$, $Ho_{0.95}Gd_{0.05}Co_2$, $Gd_{0.5}Dy_{0.5}Ni_2$, or $Dy_{0.75}Er_{0.25}Al_2$.

14. The process of any one of clauses 1 to 12, wherein the magnetic refrigerant material is a material with a second order phase transition.

15. The process of any one of clauses 1 to 14, wherein the liquefied hydrogen exiting the expander is at a temperature of 20 to 23 K and a pressure of 15 to 35 psia.

16. The process of any one of clauses 1 to 15, wherein the hydrogen heat transfer fluid exiting the cold side of the low magnetic or demagnetized field section is at a temperature of 20 to 23 K and a pressure of 300 psia.

17. The process of any one of clauses 1 to 16, further comprising continuously introducing the hydrogen heat transfer fluid from the hot side of the high magnetic field section into the hot side of the low magnetic or demagnetized field section.

18. The process of clause 17, further comprising introducing hydrogen gas from a hydrogen gas source into the hydrogen heat transfer fluid flowing from the hot side of the high magnetic field section into the hot side of the low magnetic or demagnetized field section.

19. The process of any one of clauses 1 to 18, wherein the hydrogen heat transfer fluid consists essentially of hydrogen.

20. A system comprising:
an active magnetic regenerative refrigerator apparatus that comprises (i) a high magnetic field section in which a hydrogen heat transfer fluid can flow from a cold side to a hot side through at least one magnetized bed of at least one magnetic refrigerant, (ii) a first no heat transfer fluid flow section in which the bed can be demagnetized, (iii) a low magnetic or demagnetized field section in which the hydrogen heat transfer fluid can flow from a hot side to a cold side through the demagnetized bed, and (iv) a second no heat transfer fluid flow section in which the bed can be magnetized;
a first conduit fluidly coupled between the cold side of the low magnetic or demagnetized field section and the cold side of the high magnetic field section; and
a second conduit fluid coupled to the first conduit, an expander and at least one liquefied hydrogen storage module.

21. The system of clause 20, wherein the active magnetic regenerative refrigerator apparatus comprises a composition that includes at least one magnetic refrigerant material and at least one ortho $H_2$ to para $H_2$ catalyst.

22. The system of clause 21, wherein the magnetic refrigerant material is in the form of particles having a largest cross section dimension of up to 250 μm.

23. The system of clause 21, wherein the composition comprises magnetic refrigerant material particles having a largest cross section dimension of up to 250 μm, and a binder interspersed with the particles, wherein the ortho $H_2$ to para $H_2$ catalyst is bonded to the particles and/or the binder.

24. The system of clause 21, wherein the composition comprises magnetic refrigerant material particles having a largest cross section dimension of up to 250 μm, and ortho $H_2$ to para $H_2$ catalyst particles having a largest cross section dimension of less than 5 μm.

25. The system of any one of clauses 22 to 24, wherein the magnetic refrigerant material particles have a diameter of 150 to 250 μm.

26. The system of clause 23, wherein the binder comprises at least one epoxy material.

27. The system of any one of clauses 20 to 26, wherein the magnetic refrigerant material is selected from Gd, $Gd_{0.90}Y_{0.10}$, $Gd_{0.30}Tb_{0.70}$, $Gd_{0.69}Er_{0.31}$, $Gd_{0.02}Tb_{0.98}$, $Gd_{0.32}Dy_{0.68}$, $Gd_{0.66}Y_{0.34}$, $Gd_{0.39}Ho_{0.61}$, $Gd_{0.59}Y_{0.41}$, $Gd_{0.15}Dy_{0.85}$, $Gd_{0.42}Er_{0.58}$, $Gd_{0.27}Ho_{0.73}$, $Gd_{0.16}Ho_{0.84}$, $Gd_{0.34}Er_{0.66}$, $Gd_{0.23}Er_{0.77}$, $(Ho_{0.80}Gd_{0.20})Co_2$, $Ho_{0.90}Gd_{0.10}Co_2$, $Ho_{0.95}Gd_{0.05}Co_2$, $Gd_{0.5}Dy_{0.5}Ni_2$, or $Dy_{0.75}Er_{0.25}Al_2$.

28. The system of any one of clauses 20 to 26, wherein the magnetic refrigerant material is a material with a second order phase transition.

29. A method for making a magnetic refrigerant composition, comprising:
contacting magnetic refrigerant material particles having a largest cross section dimension of up to 250 μm with a binder;
curing the binder; and
bonding an ortho $H_2$ to para $H_2$ catalyst to the bonded magnetic refrigerant material particles.

In view of the many possible embodiments to which the principles of the disclosed invention may be applied, it should be recognized that the illustrated embodiments are only preferred examples of the invention and should not be taken as limiting the scope of the invention.

What is claimed is:

1. A system comprising:
an active magnetic regenerative refrigerator apparatus that comprises (i) a high magnetic field section in which a heat transfer fluid comprising a hydrogen fluid can flow from a cold side to a hot side through at least one magnetized bed of at least one magnetic refrigerant, (ii) a first no heat transfer fluid flow section in which a bed can be demagnetized, (iii) a low magnetic field or demagnetized section in which the heat transfer fluid can flow from a hot side to a cold side through a demagnetized bed, and (iv) a second no heat transfer fluid flow section in which a bed can be magnetized;

a first conduit fluidly coupled between the cold side of the low magnetic field or demagnetized section and the cold side of the high magnetic field section; and a second conduit fluidly coupled to the first conduit, an expander and at least one liquefied hydrogen storage module, wherein the second conduit is configured for supplying a portion the heat transfer fluid comprised of a liquefied hydrogen from the active magnetic regenerative refrigerator apparatus to the liquefied hydrogen storage module.

2. The system of claim 1, wherein the active magnetic regenerative refrigerator apparatus comprises a composition that includes at least one magnetic refrigerant material and at least one ortho $H_2$ to para $H_2$ catalyst.

3. The system of claim 2, wherein the magnetic refrigerant material is in the form of particles having a largest cross section dimension of up to 250 μm.

4. The system of claim 1, wherein the active magnetic regenerative refrigerator apparatus includes a plurality of magnetic refrigerant layers.

5. The system of claim 1, wherein the active magnetic regenerative refrigerator apparatus includes 1 to 16 layers of compositionally distinct magnetic refrigerant materials.

6. The system of claim 1, wherein the active magnetic regenerative refrigerator apparatus includes up to 13 layers of compositionally distinct magnetic refrigerant materials.

7. The system of claim 4, wherein each layer comprises a composition that includes at least one magnetic refrigerant material and at least one ortho $H_2$ to para $H_2$ catalyst.

8. The system of claim 7, wherein the composition comprises magnetic refrigerant material particles having a largest cross section dimension of up to 250 μm, and a binder interspersed with the particles, wherein the ortho $H_2$ to para $H_2$ catalyst is bonded to the particles and/or the binder.

9. The system of claim 7, wherein the ortho $H_2$ to para $H_2$ catalyst comprises particles having a largest cross section dimension of less than 5 μm.

10. The system of claim 8, wherein the magnetic refrigerant material particles have a diameter of 150 to 250 μm.

11. The system of claim 8, wherein the magnetic refrigerant material particles have a diameter of 100 to 250 μm.

12. The system of claim 8, wherein the binder comprises at least one epoxy material.

13. The system of claim 2, wherein the magnetic refrigerant material is selected from Gd, $Gd_{0.90}Y_{0.10}$, $Gd_{0.30}Tb_{0.70}$, $Gd_{0.69}Er_{0.31}$, $Gd_{0.02}Tb_{0.98}$, $Gd_{0.32}Dy_{0.68}$, $Gd_{0.66}Y_{0.34}$, $Gd_{0.39}Ho_{0.61}$, $Gd_{0.59}Y_{0.41}$, $Gd_{0.15}Dy_{0.85}$, $Gd_{0.42}Er_{0.58}$, $Gd_{0.27}Ho_{0.73}$, $Gd_{0.16}Ho_{0.84}$, $Gd_{0.34}Er_{0.66}$, $Gd_{0.23}Er_{0.77}$, $(Ho_{0.80}Gd_{0.20})Co_2$, $Ho_{0.90}Gd_{0.10}Co_2$, $Ho_{0.95}Gd_{0.05}Co_2$, $Gd_{0.5}Dy_{0.5}Ni_2$, or $Dy_{0.75}Er_{0.25}Al_2$.

14. The system of claim 2, wherein the magnetic refrigerant material is $Gd_{0.83}Dy_{0.17}$, or $(Gd_xEr_{1-x})Al_2$, wherein x is 0 or 1.

15. The system of claim 2, wherein the magnetic refrigerant material is a material with a second order phase transition.

16. The system of claim 1, wherein the at least one liquefied hydrogen storage module is a vessel.

17. The system of claim 1, wherein the active magnetic regenerative refrigerator apparatus is in the shape of a circular wheel.

18. The system of claim 1, wherein the system does not include a subsystem configured for separating a portion flow of a cold heat transfer fluid to form a bypass stream in counterflow with a hydrogen process fluid to be cooled and liquefied in a process heat exchanger.

19. The system of claim 4, wherein the system does not include a subsystem configured for separating a portion flow of a cold heat transfer fluid to form a bypass stream in counterflow with a hydrogen process fluid to be cooled and liquefied in a process heat exchanger.

20. The system of claim 8, wherein the system does not include a subsystem configured for separating a portion flow of a cold heat transfer fluid to form a bypass stream in counterflow with a hydrogen process fluid to be cooled and liquefied in a process heat exchanger.

* * * * *